United States Patent [19]

Kagawa et al.

[11] Patent Number: 5,431,701
[45] Date of Patent: Jul. 11, 1995

[54] MANUFACTURING METHOD OF FILM TYPE BATTERY

[75] Inventors: Hiroshi Kagawa; Shiro Kato; Kazuo Murata, all of Takatsuki, Japan

[73] Assignee: Yuasa Corporation, Osaka, Japan

[21] Appl. No.: 122,569

[22] PCT Filed: Feb. 8, 1993

[86] PCT No.: PCT/JP93/00159
§ 371 Date: Oct. 1, 1993
§ 102(e) Date: Oct. 1, 1993

[87] PCT Pub. No.: WO93/16497
PCT Pub. Date: Aug. 19, 1993

[30] Foreign Application Priority Data

Feb. 14, 1992 [JP] Japan ................... 4-061213

[51] Int. Cl.6 ............................................. H01M 6/12
[52] U.S. Cl. ............................... 29/623.2; 29/623.1; 429/127
[58] Field of Search .................... 29/623.1, 623.2; 429/127

[56] References Cited

U.S. PATENT DOCUMENTS 5,314,507  5/1994  Rossoll ................... 29/623.2

FOREIGN PATENT DOCUMENTS 124359     7/1985   Japan ................... 29/623.2
61-230269 10/1986   Japan .
61-273857 12/1986   Japan .
62-226575 10/1987   Japan .
62-281273 12/1987   Japan .
63-119155  5/1988   Japan .

Primary Examiner—John S. Maples
Attorney, Agent, or Firm—Evenson, McKeown, Edwards & Lenahan

[57] ABSTRACT

A method for manufacturing a film type battery equipped with a generating element composed of a positive active material, an electrolyte and a negative active material placed one upon another in a layer structure. In order to enable easy mass-production of the film type battery having the above structure, the manufacturing method includes the steps of installing sealing agent layers on a surface of a positive current collector plate and placing the component materials of the generating element i.e. the positive active material, the electrolyte and the negative active material to through holes of the sealing agent layers.

9 Claims, 9 Drawing Sheets

MANUFACTURING METHOD OF FILM TYPE BATTERY

BACKGROUND OF THE INVENTION

This application is a 371 of PCT/JP93/00159 filed Feb. 8, 1993.

1. Technical Field

This invention relates to a method of manufacturing of film type batteries for use in the fields of electronic equipment and electric automobiles etc.

2. Background Art

Figure 30:
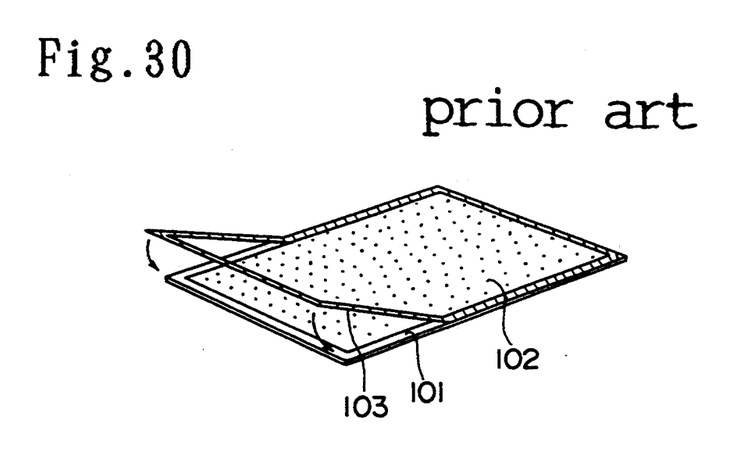
FIG. 30 is a perspective view showing one process of a conventional manufacturing method of a film type battery.

FIG. 30 is an oblique view showing one process of a conventional manufacturing method of a film type battery. In the conventional method; an active material 102 is applied within a region of a frame after installing the frame on a surface of a current collector plate 101, the frame is removed and a sealing agent 103 is put on the area where the frame had been installed, so as to form an active material layer on the current collector plate 101, an electrolyte layer is formed on a separate current collector plate in the same way, and these current collector plates are placed one upon another.

In the above conventional method, however, the work for removing the frame and putting the sealing agent 103 on the area where the frame has been installed is troublesome, so that this method is inefficient for mass-production. Further, the active material layer and the electrolyte layer are formed on different current collector plates respectively, so that applied thicknesses and applied areas of the active material and the electrolyte are apt to be scattered to cause dispersion of battery quality.

An object of this invention is to provide a manufacturing method of a highly-efficient film type battery enabling easy mass-production of the battery without producing any dispersion of battery quality.

SUMMARY OF THE INVENTION

In a manufacturing method of a film type battery equipped with a generating element composed of a positive active material, an electrolyte and a negative active material placed one upon another in a layer structure; this invention is characterized in that the method includes a step of installing a layer comprising a sealing agent on a surface of a first current collector plate, a step of holding the composition materials of the generating element to a through hole of the layer comprising the sealing agent, and a step of installing a second current collector plate after composing the generating element.

The installation and holding step may be carried out as follows:

(1) When the installation step is composed of three steps for installing three layers comprising the sealing agent, a holding step for holding one-side active material is carried out after a first installation step, a holding step for holding the electrolyte is carried out after a next installation step, and a holding step for holding the other-side active material is carried out after the last installation step.

(2) When the installation step is composed of two steps for installing two layers comprising the sealing agent, a holding step for holding one-side active material is carried out after a former installation step, and a holding step for holding the electrolyte and the other-side active material in this order is carried out after a latter installation step.

(3) When the installation step is composed of two steps for installing two layers comprising the sealing agent. A holding step for holding one-side active material and the electrolyte in this order is carried out after a former installation step, and a holding step for holding the other-side active material is carried out after a latter installation process.

(4) When the installation step is composed of one step for installing one layer comprising the sealing agent, a holding step for holding one-side active material, the electrolyte and the other-side active material in this order is carried out after the installation step.

In this invention, the generating element is formed by carrying out the installation step and the holding step continuously, so that it can be formed with good workability. Therefore, according to the present invention, the film type battery can be efficiently mass-produced. Further, since the generating element is formed in the through hole of the layer comprising the sealing agent, its dimensions are determined by dimensions of the through hole. In addition, a thickness of the layer comprising the sealing agent and a size of the through hole can be set to specified values precisely and easily. Consequently, the generating element can be set to a specified size precisely and easily. That is, the generating element or the film type battery can be obtained without producing any dispersion of its quality.

At least one of the first and second current collector plates may be made of a foil or a deposition film having a thickness of 0.001 mm to 0.05 mm, and a ground paper comprising the sealing agent may be stuck to the current collector plate. According to this procedure, the current collector plate can be wound up in a roll etc. easily without producing a pin hole or a crack, so that workability can be improved.

In at least one of the installation steps, a layer having a peeling layer on its surface may be used for the layer comprising the sealing agent, and the peeling layer may be removed after the holding step succeeding the installation step. According to this procedure, the surface of layer comprising the sealing agent can be prevented from being contaminated by the holding process, so that the sealing ability of the film type battery owing to the sealing agent can be made better and performance of the film type battery can be improved.

The thickness of the peeling layer may be set approximately equal to the difference of thicknesses before and after drying of the material of which the generating element held by the holding step is composed. According to this procedure, the need for removing an excessive amount of the composition material becomes unnecessary after removing the peeling layer, so that holding the composition material in the holding step succeeding the next installation step becomes easy and the workability is improved.

DESCRIPTION OF THE PREFERRED EMBODIMENTS

Embodiment 1

Figure 1:
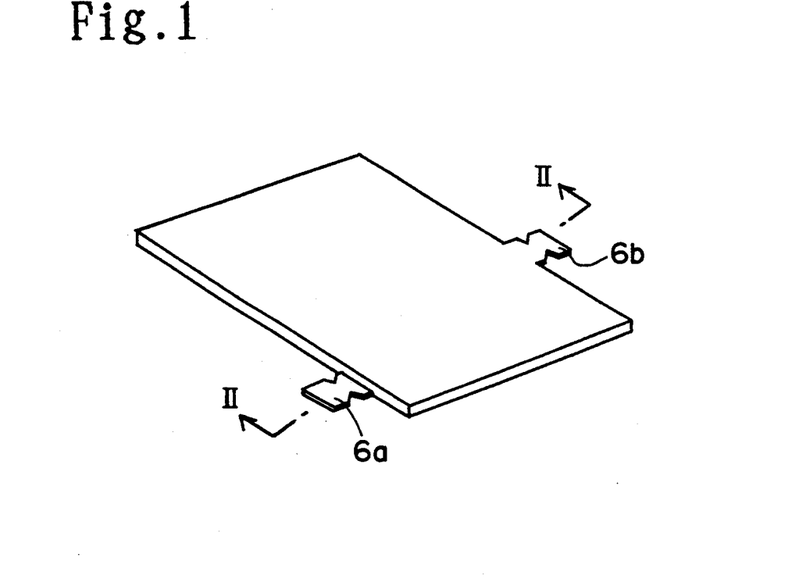
FIG. 1 is a perspective view of a film type battery obtained by the method of a first embodiment of the invention.
Figure 2:
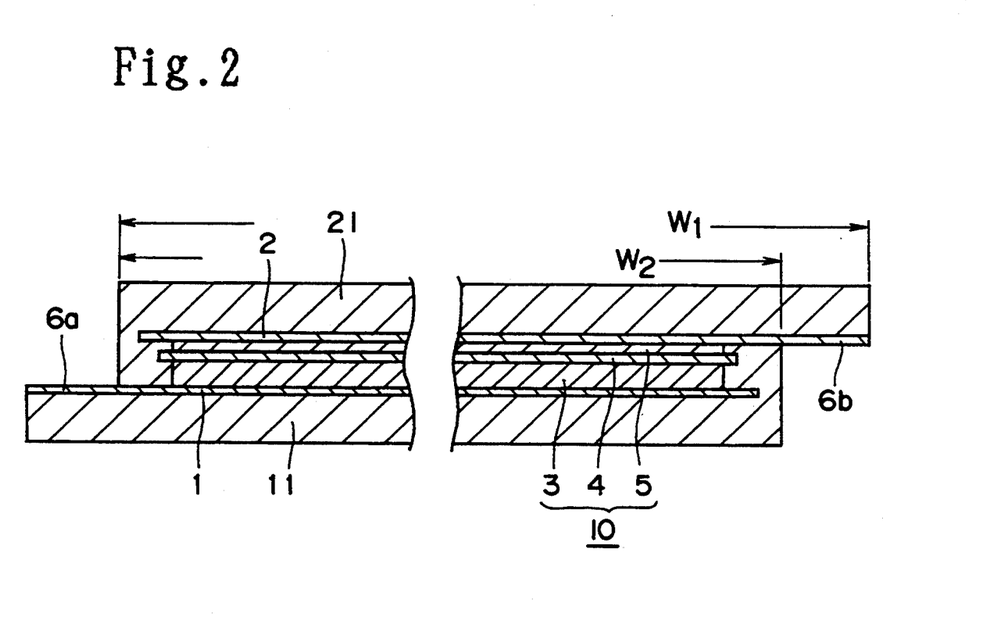
FIG. 2 is a sectional view taken on the line II—II of FIG. 1.

FIG. 1 is a perspective view showing a film type battery obtained by a manufacturing method of this invention, and FIG. 2 is a sectional view taken on the line II—II of FIG. 1. In the figures, 1 and 2 are a positive current collector plate and a negative current collector plate made of stainless steel foil, 3 is a layer comprising a positive active material, 4 is a layer comprising an electrolyte, and 5 is a layer comprising a negative active material. A ground paper 11 comprising a sealing agent is bonded to a lower surface of the positive current collector plate 1, and a ground paper 21 comprising the sealing agent is also bonded to an upper surface of the negative current collector plate 2. A generating element 10 is composed of the layers 3, 4 and 5, and the generating element 10 is held between both current collector plates 1 and 2 and sealed by the sealing agent. 6a is a positive terminal and 6b is a negative terminal. The ground papers 11 and 21 are bonded to both terminals 6a and 6b respectively, so that electric short-circuiting is prevented in this way.

A method of manufacturing the film type battery having the above structure will be explained hereunder with reference to the drawings. Polypropylene-based resin was used for the sealing agent and a material comprising polyethylene-based resin was used for the peeling layer. Dimensions of the above components were as follows; a width $W_1$ was 400 mm, a width $W_2$ was 300 mm, thicknesses of the ground papers 11 and 21 were 0.1 mm, thicknesses of the both current collector plates 1 and 2 were 0.02 mm, a thickness of the layer 3 was 0.05 mm, and thicknesses of the layer 4 and 5 were 0.02 mm.

Figure 3:
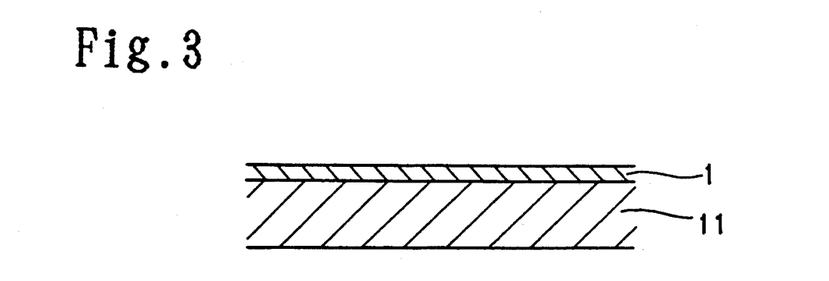
FIGS. 3 through 19 are vertical sectional views showing the method of embodiment 1 in order of process.
Figure 4:
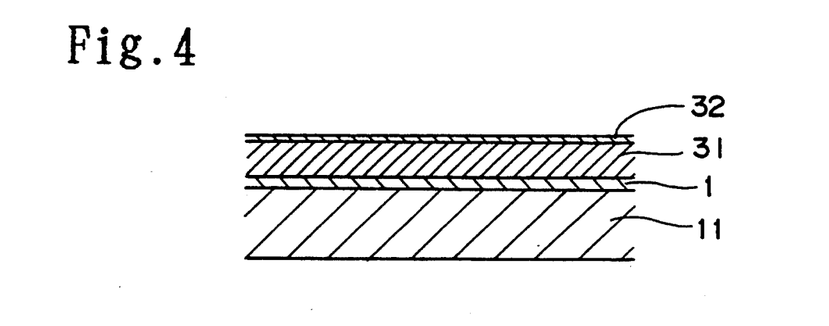
Figure 5:
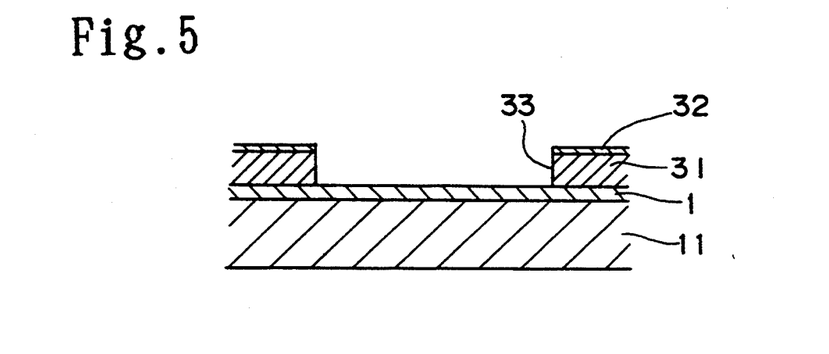
Figure 6:
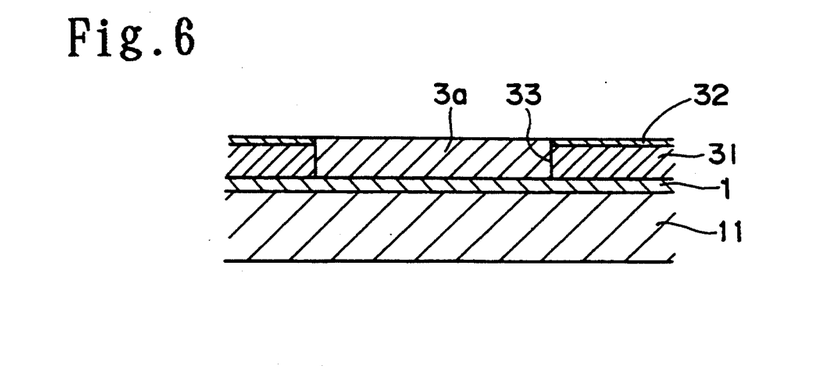
Figure 7:
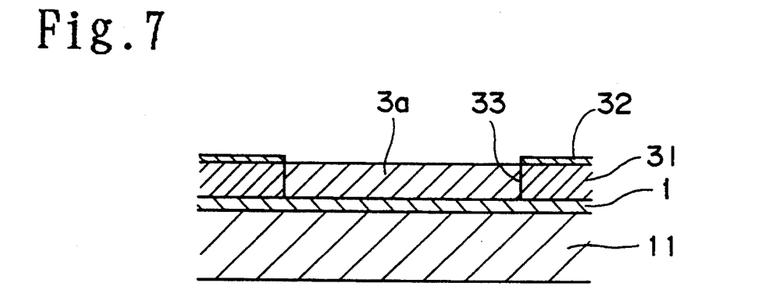
Figure 8:
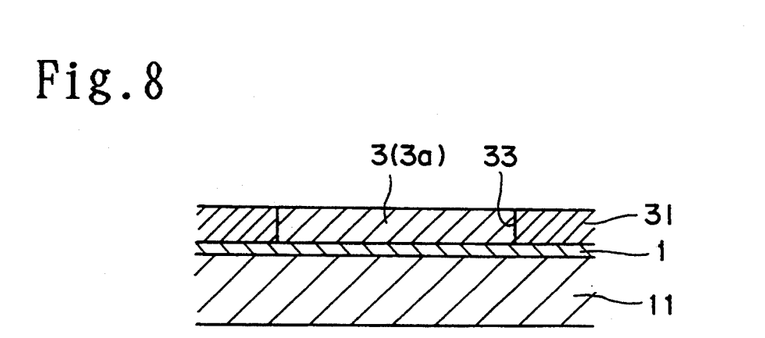

In the first place, the positive current collector plate 1 was bonded onto the ground paper 11 as shown in FIG. 3. A peeling layer 32 having a thickness of 0.01 mm was formed on an upper surface of a sealing agent layer 31 having a thickness of 0.05 mm, and the sealing agent layer 31 was bonded onto the positive current collector plate 1 as shown in FIG. 4. A through hole 33 having a specified dimension was made on the peeling layer 32 and the sealing agent layer 31 by half-cutting as shown in FIG. 5. A positive active material 3a was applied within the through hole 33 to a thickness of 0.06 mm as shown in FIG. 6, and dried at a temperature of about 50° C. to about 250° C. By this drying, the thickness of positive active material 3a contracted by about 20% so that this thickness became approximately same with that of the sealing agent layer 31 as shown in FIG. 7. A thickness of the peeling layer 32 was set approximately equal to a difference of thicknesses before and after drying of the positive active material 3a. The peeling layer 32 was then removed as shown in FIG. 8. Thereby, the layer 3 comprising the positive active material 3a was held to the sealing agent layer 31.

Figure 9:
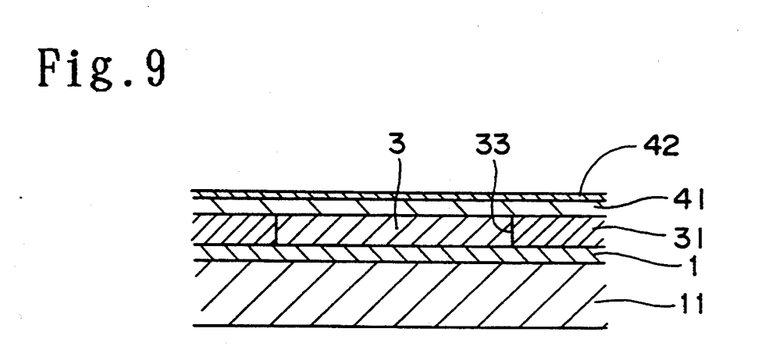
Figure 10:
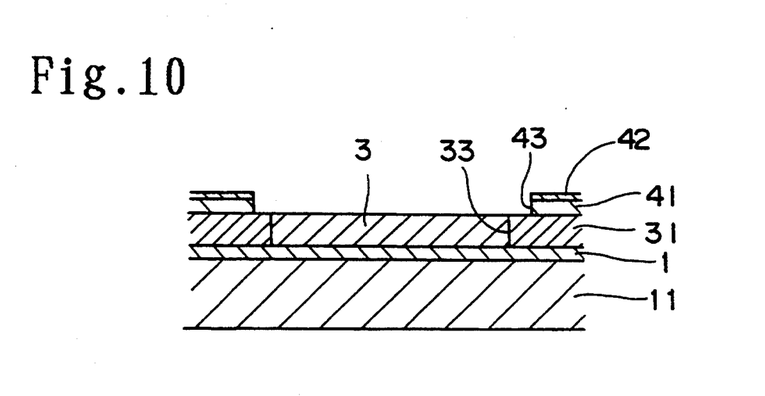
Figure 11:
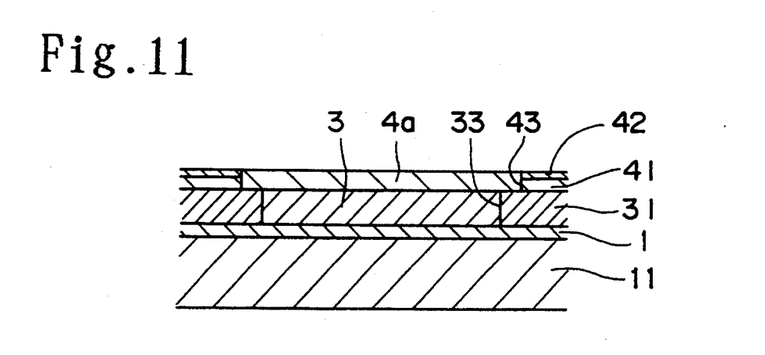
Figure 12:
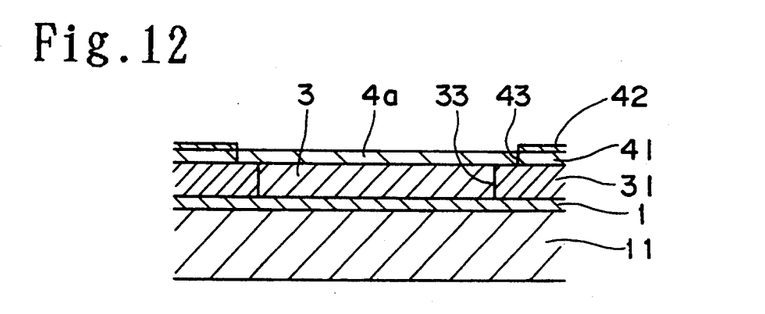
Figure 13:
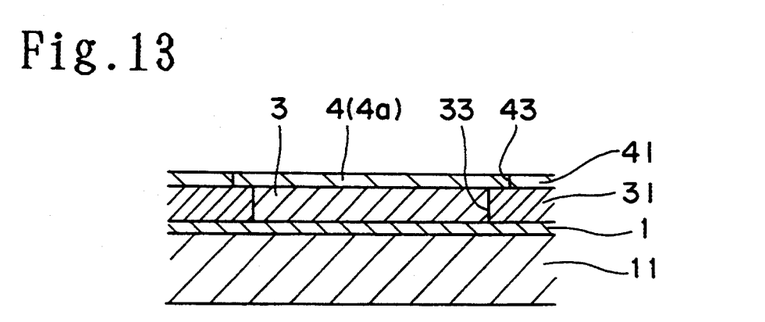

In the second place, a peeling layer 42 having a thickness of 0.01 mm was formed on an upper surface of a sealing agent layer 41 having a thickness of 0.02 mm, and the sealing agent layer 41 was bonded onto the layer 3 and the sealing agent layer 31 as shown in FIG. 9. A through hole 43 having a dimension slightly larger than that of the through hole 33 was made on the peeling layer 42 and the sealing agent layer 41 by half-cutting as shown in FIG. 10. An electrolyte 4a was applied within the through hole 43 to a thickness of 0.03 mm as shown in FIG. 11, and dried at a temperature of about 50° C. to about 250° C. By this drying, the thickness of electrolyte 4a contracted by about 30% so that this thickness became approximately equal to that of the sealing agent layer 41 as shown in FIG. 12. A thickness of the peeling layer 42 was set approximately equal to a difference of thicknesses before and after drying of the electrolyte 4a. The peeling layer 42 was then removed as shown in FIG. 13. Thereby, the layer 4 comprising the electrolyte 4a was held to the sealing agent layer 41.

Figure 14:
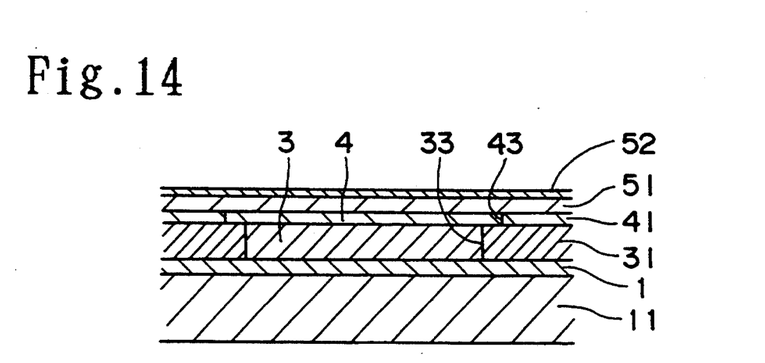
Figure 15:
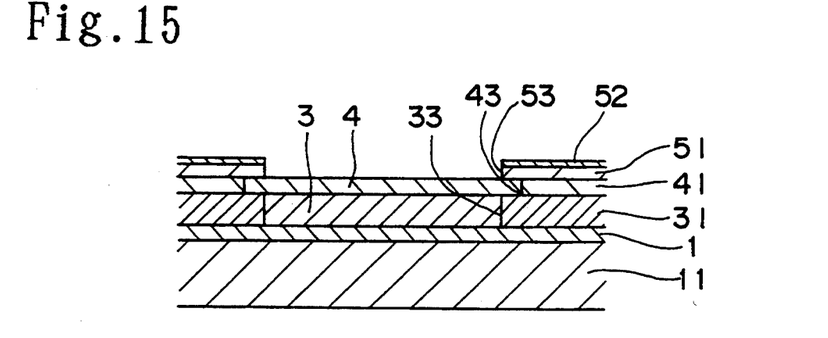
Figure 16:
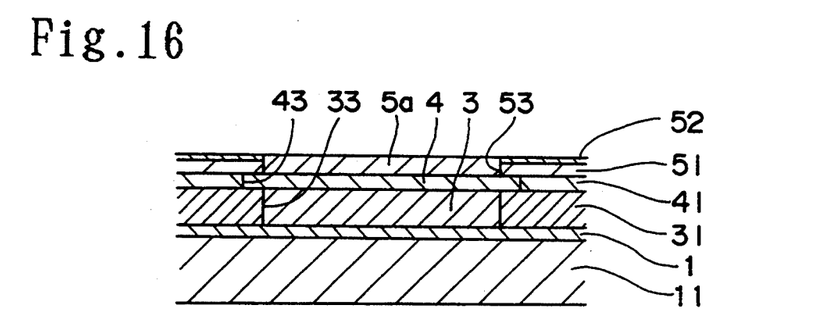
Figure 17:
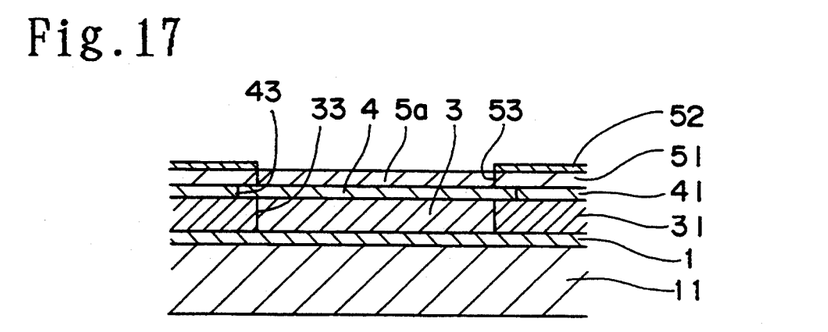
Figure 18:
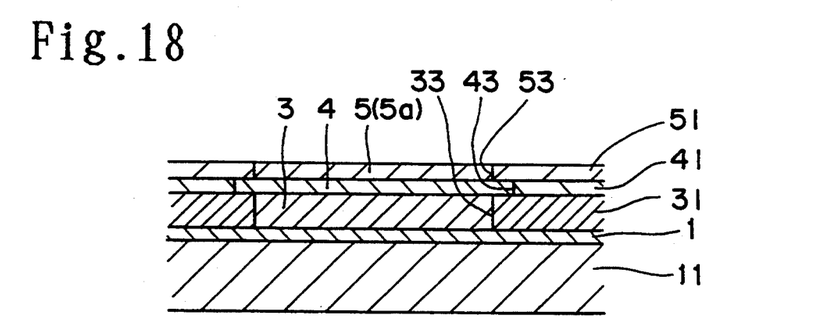

In the third place, a peeling layer 52 having a thickness of 0.01 mm was formed on an upper surface of a sealing agent layer 51 having a thickness of 0.02 mm, and the sealing agent layer 51 was bonded onto the electrolyte layer 4 and the sealing agent layer 41 as shown in FIG. 14. A through hole 53 having the same dimensions with that of the through hole 33 was made on the peeling layer 52 and the sealing agent layer 51 by half-cutting as shown in FIG. 15. A negative active material 5a was applied within the through hole 53 to a thickness of 0.03 mm as shown in FIG. 16, and dried at a temperature of about 50° C. to about 250° C. By this drying, the thickness of negative active material 5a contracted by about 30% so that this thickness became approximately equal to that of the sealing agent layer 51 as shown in FIG. 17. A thickness of the peeling layer 52 was set approximately equal to a difference of thicknesses before and after drying of the negative active material 5a. The peeling layer 52 was then removed as shown in FIG. 18. Thereby, the sealing agent layer 51 holding the layer 5 comprising the negative active material 5a was obtained.

Figure 19:
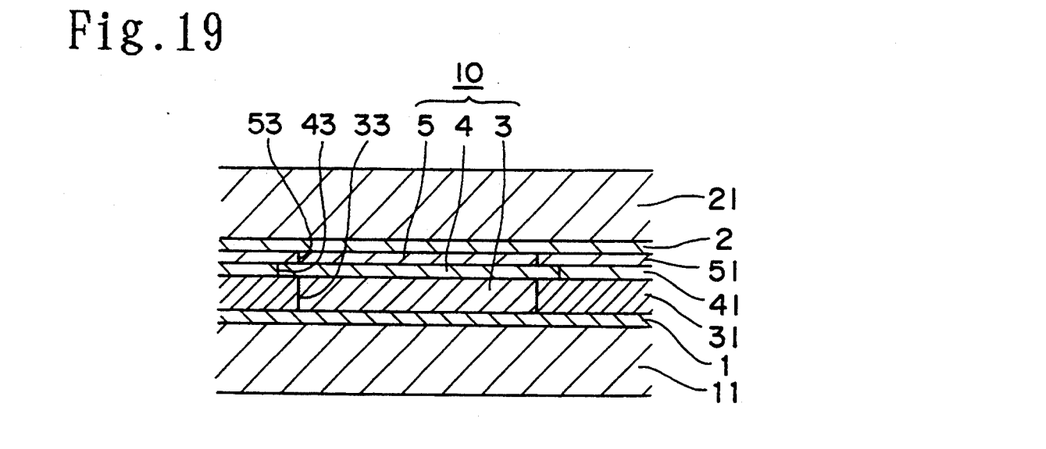

As illustrated by FIG. 19, the ground paper 21 was bonded onto an upper surface of the negative current collector plate 2, and the negative current collector plate 2 was bonded onto the layer 5 and the sealing agent layer 51. The ground papers 11 and 21, the sealing agent layer 31, 41 and 51 were melt bonded under reduced pressure so as to seal the generating element 10 under reduced pressure. Its outer periphery was half cut to form the both terminals 6a and 6b (FIG. 1) so as to trim its external form to conform to the battery.

In the method of this embodiment; the layer 3 is formed by continuously carrying out the installation step for installing the sealing agent layer 31 and the holding step for holding the positive active material 3a to the through hole 33 of the sealing agent layer 31, the layer 4 is formed by continuously carrying out the installation step for installing the sealing agent layer 41 and the holding step for holding the electrolyte 4a to the through hole 43 of the sealing agent layer 41, and the layer 5 is formed by continuously carrying out the installation step for installing the sealing agent layer 51 and the holding step for holding the negative active material 5a to the through hole 53 of the sealing agent layer 51. Namely, the generating element 10 comprising the layers 3, 4 and 5 is formed by continuously carrying out installation step and holding steps comprising similar procedures. Consequently, according to the above method, the film type battery can be manufactured with good workability, that is, it can be efficiently mass produced.

As an example, the throughput of a battery from a mass-production line was 30 cells/min. maximum in the case of the conventional method shown in FIG. 30 however, it was increased to 100 cells/min. in case of the method of this embodiment. That is, the mass-production ability was improved by the method of this embodiment.

Since the layer 3 is formed within the through hole 33, its dimensions are determined by those of the through hole 33. Dimensions of the layers 4 and 5 are also determined by those of the through hole 43 and 53 in the same way. In addition, the thicknesses of the respective layers 3, 4 and 5 and the dimensions of the respective through holes 33, 43 and 53 can be set to specified dimensions precisely and easily. Accordingly, the generating element 10 can be set to specified dimensions precisely and easily. Namely, the generating element 10 i.e. the film type battery can be obtained without producing any dispersion in its quality.

Table 1 shows the ranges of battery capacity and fractions defective at the time of manufacture for both the battery obtained by the method of this embodiment (embodiment battery) and the battery obtained by the conventional method shown by FIG. 30 (conventional battery). As seen from Table 1, the embodiment battery offers a smaller dispersion and defective fraction.

TABLE 1

|  | Embodiment battery | Conventional battery |
| --- | --- | --- |
| Battery capacity | 100~120 mAh | 87~116 mAh |
| Fraction defective | 0.07% | 10.63% |

Both current collector plates 1 and 2 comprise stainless steel foil and have a thickness of 0.02 mm, and the ground papers 11 and 21 are bonded to both current collector plates 1 and 2, so that it is easy to wind up the current collector plates 1 and 2 into a roll or the like without producing a pin hole or a crack and the workability is improved. Table 2 shows the relation between the thickness of the current collector plate and the fraction defective of air-tightness. As seen from Table 2, the fraction defective of air-tightness becomes minimal when the thickness of the current collector plate lies within a range of 0.001 mm to 0.05 mm.

TABLE 2

| Thickness of current collector plate | Fraction defective of air-tightness |
| --- | --- |
| ~0.001 mm | about 1% |
| ~0.05 mm | 0.02~0.04% |
| ~1.0 mm | 0.05~0.98% |
| 1.0 mm~ | 1.1% or more |

The component having the peeling layer 32 on its surface is used for the sealing agent layer 31 and the peeling layer 32 is removed after the holding step of the positive active material 3a, so that the surface of the sealing agent layer 31 can be prevented from being contaminated during the holding step. The components having the peeling layers 42 and 52 are used for the sealing agent layers 41 and 51 respectively and the peeling layers 42 and 52 are removed after the holding step of the positive active material 4a and negative active material 5a, so that the surfaces of the sealing agent layers 41 and 51 can be prevented from being contaminated during the holding process. Accordingly, sealing performance of the film type battery owing to the sealing agent can be improved and performance of the film type battery can be made better.

Further, the thickness of the peeling layer 32 is set approximately equal to the difference of thicknesses before and after drying of the positive active material 3a held during the holding step, so that removing an excessive amount of positive active material 3a becomes unnecessary after removing the peeling layer 32. The thicknesses of the peeling layers 42 and 52 are set approximately equal to the differences of thicknesses before and after drying of the electrolyte 4a and negative active material 5a respectively in the same way, so that removing the excessive amounts of the electrolyte 4a and the negative active material 5a become unnecessary after removing the peeling layers 42 and 52. Therefore, holding the electrolyte 4a next to the positive active material 3a and, in addition, holding the negative active material 5a next to the electrolyte 4a becomes easy so that the workability can be improved.

As described above, according to the foregoing method, the highly efficient film type battery can be obtained by mass-production easily without producing dispersion in its quality.

The through hole 33 is formed after installing the sealing agent layer 31 in the foregoing method, however, it may be previously formed on the sealing agent layer 31. That goes for the through holes 43 and 53, too.

The component having the peeling layer 32 is used for the sealing agent layer 31 however. But, a component not having the peeling layer 32 may be used. That goes for the sealing layers 41 and 51, too. The thicknesses of peeling layers 32, 42 and 52 may not be set to the above thicknesses. Even by these methods, the film type battery can be obtained easily by mass-production.

As a means for holding the negative active material, a method may be used wherein a negative active material previously prepared by half-cutting is transferred to a through hole 53.

Embodiment 2

FIG. 20 through FIG. 23 are vertical sectional views showing the method of this embodiment in order of steps. In these figures, components the same as those of the figures showing the embodiment 1 are denoted by the same symbols. Three sealing agent layers are installed in the method of embodiment 1, however, the method of this embodiment is carried out by installing two sealing agent layers. The method of this embodiment is different from the first embodiment in this way, but the same as the first embodiment in other ways.

Figure 20:
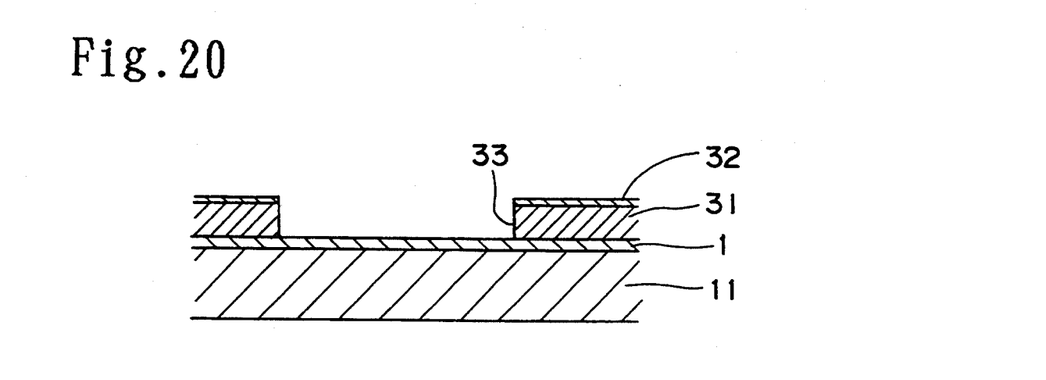
FIG. 20 through FIG. 23 are vertical sectional views showing the method of a second embodiment in order of the steps.
Figure 21:
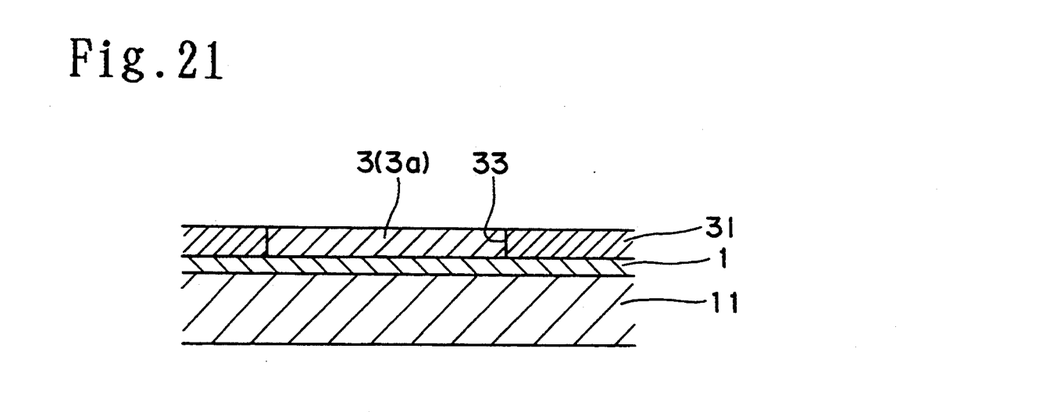
Figure 22:
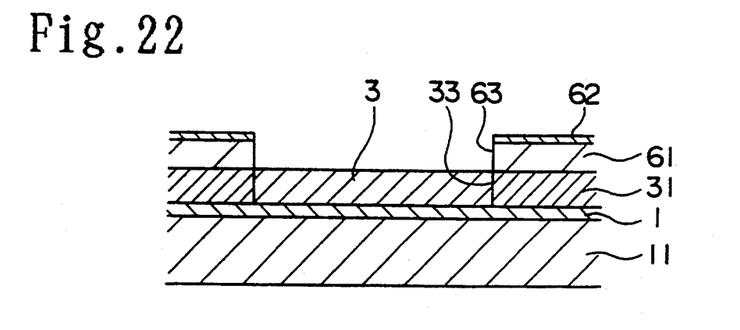
Figure 23:
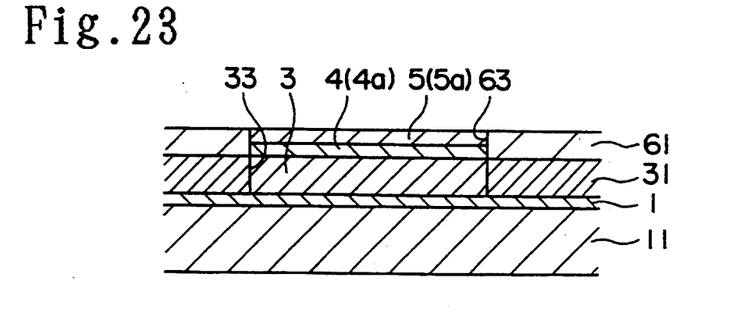

In the first place, in the method of this embodiment, the sealing agent layer 31 having the peeling layer 32 was bonded onto the positive current collector plate 1 on the ground paper 11 so as to form the through hole 33, as shown in FIG. 20. In the second place, the positive active material 3a was applied within the through hole 33 and dried, and then the peeling layer 32 was removed to have the sealing agent layer 31 hold the layer 3, as shown in FIG. 21. In the third place, a sealing agent layer 61 having a peeling layer 62 was bonded onto the layer 3 and the sealing agent layer 31 so as to form a through hole 63, as shown in FIG. 22. Here, a layer having a thickness equal to the sum of the thicknesses of the sealing agent layers 41 and 51 in embodiment 1 was used for the sealing agent layer 61. In the fourth place, the electrolyte 4a and the negative active material 5a were applied within the through hole 63 in this order and dried, and then the peeling layer 62 was removed to have the sealing agent layer 61 hold the layers 4 and 5, as shown in FIG. 23.

Since the installation step for installing the sealing agent layer combines two steps according to the method of this embodiment, the work is simplified as compared with the three steps of the first embodiment. Other functions and effects are the same as those of the first embodiment.

Embodiment 3

FIGS. 24 through 27 are vertical sectional views showing the method of the third embodiment in the order of the process. In these figures, same components as those of the figures showing the first embodiment are designated by the same symbols. Two sealing agent layers are installed in the method of this embodiment. The method of this embodiment is different from the first embodiment in this regard, but the same as the first embodiment in other ways.

Figure 24:
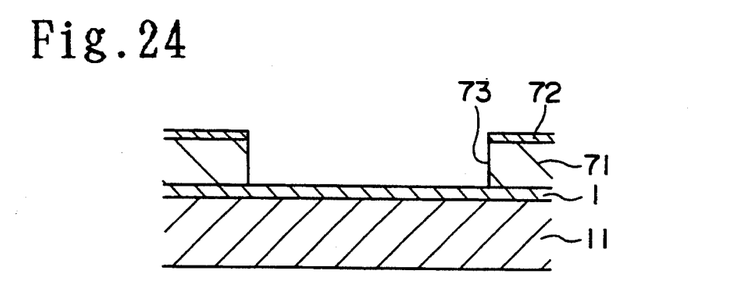
FIGS. 24 through 27 are vertical sectional views showing the method of a third embodiment in order of the steps.
Figure 25:
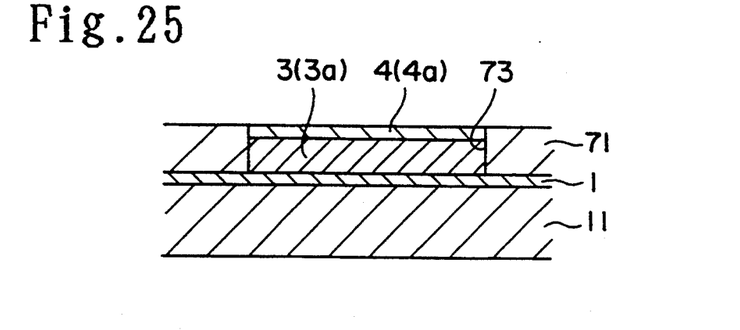
Figure 26:
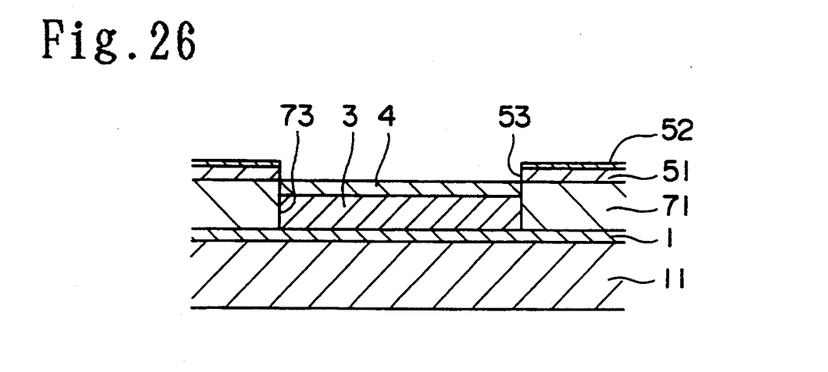
Figure 27:
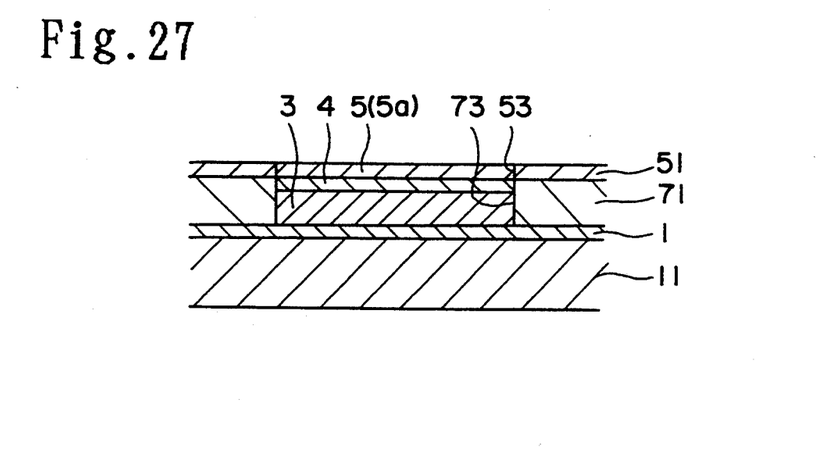

In the first place, in the method of this embodiment, a sealing agent layer 71 having a peeling layer 72 was bonded onto the positive current collector plate 1 on the ground paper 11 so as to form a through hole 73, as shown in FIG. 24. Here, a layer having a thickness equal to the sum of the thicknesses of the sealing agent layers 31 and 41 the first embodiment was used for the sealing agent layer 71. In the second place, the positive active material 3a and the electrolyte 4a were applied within a through hole 73 in this order and dried, and then the peeling layer 72 was removed to have the sealing agent layer 71 hold the layers 3 and 4, as shown in FIG. 25. In the third place, a sealing agent layer 51 having a peeling layer 52 was bonded onto the layer 4 and the sealing agent layer 71 so as to form a through hole 53, as shown in FIG. 26. In the fourth place, the negative active material 5a was applied within the through hole 53 and dried, and then the peeling layer 52 was removed to have the sealing agent layer 51 hold the layer 5, as shown in FIG. 27.

Since the installation process for installing the sealing agent layer comprises two steps according to the method of this embodiment, the work is simplified as compared with the three steps of the first embodiment. Other functions and effects are same as those of the first embodiment.

Embodiment 4

Figure 28:
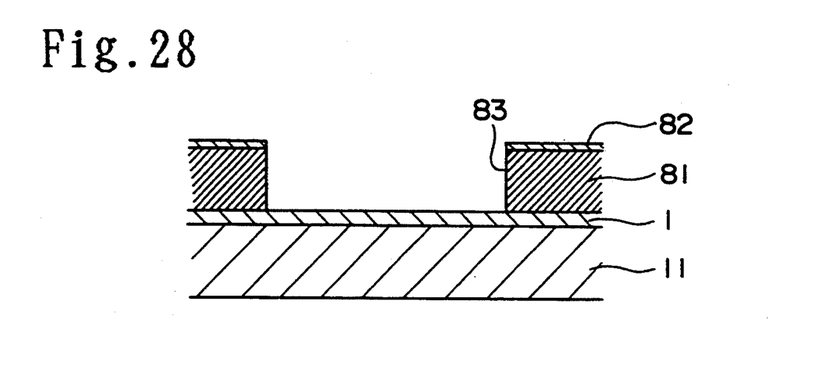
FIGS. 28 and FIG. 29 are vertical sectional views showing the method of a fourth embodiment in order of the steps.
Figure 29:
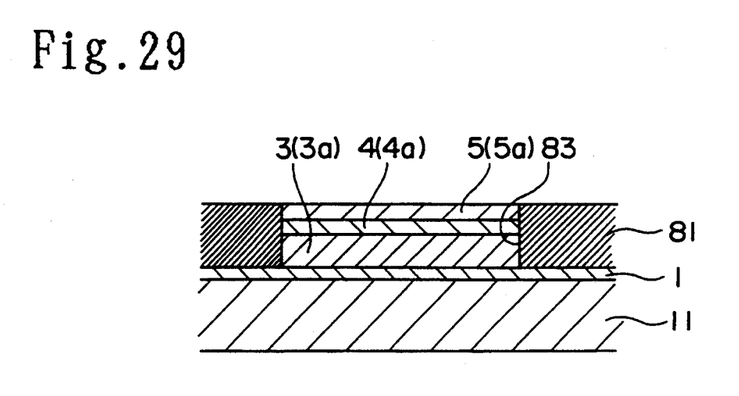

FIG. 28 and FIG. 29 are vertical sectional views showing the method of this embodiment in order of steps. In these figures, components which are the same as those of the figure showing the first embodiment are designated by the same symbols. One sealing agent layer is installed in the method of this embodiment. The method of this embodiment is different from the first embodiment in this regard, but the same as the first embodiment in other ways.

In the first place, in the method of this embodiment, a sealing agent layer 81 having a peeling layer 82 was bonded onto the positive current collector plate 1 on the ground paper 11 so as to form a through hole 83, as shown in FIG. 28. Here, a layer having thickness equal to the sum of the thicknesses of the sealing agent layers 31, 41 and 51 in embodiment 1 was used for the sealing agent layer 81. In the second place, the positive active material 3a, the electrolyte 4a and the negative active material 5a were applied within a through hole 83 in this order and dried, and then the peeling layer 82 was removed to have the sealing agent layer 81 hold the layers 3, 4 and 5, as shown in FIG. 29.

Since the installation process for installing the sealing agent layer comprises one step according to the method of this embodiment, the work is simplified as compared with the three steps of the first embodiment. Other functions and effects are same with those of embodiment 1.

Industrial Applicability

The manufacturing method of this invention is effectively utilized in a production site where a high efficiency film type battery is mass-produced.

What is claimed is:

1. A method for manufacturing a film type battery comprising a generating element which comprises as its components a positive active material, an electrolyte and a negative active material placed one upon another in a layer structure; said method comprising installing at least one sealing agent layer having a peeling layer on its surface and with a cavity therein over a surface of a first current collector plate, placing at least one of said components in said cavity, removing the peeling layer, and installing a second current collector plate over said sealing agent layer and cavity.

2. A method for manufacturing a film type battery as set forth in claim 1, comprising installing a first sealing agent layer having a first cavity therein on a surface of a first current collector plate, placing said positive active material component in said cavity, installing a second sealing agent layer having a second cavity therein over said first sealing agent layer and first cavity, placing said electrolyte component in said second cavity, installing a third sealing agent layer having a third cavity therein over said second sealing agent layer and second cavity, placing said negative active material component in said third cavity, and installing a second current collector plate over said third sealing agent layer and third cavity.

3. A method for manufacturing a film type battery as set forth in claim 1, comprising installing a first sealing agent layer having a first cavity therein on a surface of a first current collector plate, placing said positive active material component in said first cavity, installing a second sealing agent layer having a second cavity therein over said first sealing agent layer and first cavity, placing said electrolyte component in said second cavity, placing said negative active material component over said electrolyte component in said second cavity, and installing a second current collector plate over said second sealing agent layer and second cavity.

4. A method for manufacturing a film type battery as set forth in claim 1, comprising installing a first sealing agent layer having a first cavity therein on a surface of a first current collector plate, placing said positive active material component in said first cavity, placing said electrolyte component over said positive active material in said first cavity, installing a second sealing agent layer having a second cavity therein over said first sealing agent layer and first cavity, placing said negative active material component in said second cavity, and installing a second current collector plate over said second sealing agent layer and second cavity.

5. A method for manufacturing a film type battery as set forth in claim 1, comprising installing one sealing agent layer having a peeling layer on its surface and with a cavity therein on a surface of a first current collector plate, and placing the positive active material, electrolyte and negative active material components, in that order, in said cavity.

6. A manufacturing method for a film type battery as set forth in any one of claims 1 through 5, in which at least one of the first and second current collector plates comprises a foil or a deposition film having a thickness of 0.001 mm to 0.05 mm, said method further comprising adhering a base layer comprising a sealing agent to the current collector plate.

7. A method for manufacturing a film type battery as set forth in claim 5, further comprising drying said components after placing the same in said cavity thereby resulting in shrinkage thereof, wherein the thickness of the peeling layer is approximately equal to the difference between the thickness of the components in the cavity before and after drying.

8. A method for manufacturing a film type battery as set forth in any one of claims 2 through 4, wherein at least one of said sealing agent layers has a peeling layer on its surface and the peeling layer is removed after at least one of said generating element components is placed in the cavity therein.

9. A method for manufacturing a film type battery as set forth in claim 8, further comprising drying said at least one component after placing the same in said cavity thereby resulting in shrinkage thereof, wherein the thickness of the peeling layer is approximately equal to the difference between the thicknesses of the at least one generating element component before and after drying.

* * * * *